(12) United States Patent
Hoshii

(10) Patent No.: US 7,605,960 B2
(45) Date of Patent: Oct. 20, 2009

(54) IMAGE PROCESSING APPARATUS AND GRADATION REPRODUCTION METHOD

(75) Inventor: Jun Hoshii, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 540 days.

(21) Appl. No.: 11/389,059

(22) Filed: Mar. 27, 2006

(65) Prior Publication Data
US 2006/0232801 A1    Oct. 19, 2006

(30) Foreign Application Priority Data
Mar. 28, 2005    (JP) ............................. 2005-090765

(51) Int. Cl.
G06T 5/00    (2006.01)
G06K 9/00    (2006.01)
(52) U.S. Cl. .................. 358/518; 358/1.9; 358/519; 358/520; 382/162
(58) Field of Classification Search ............... 358/1.9, 358/1.1
See application file for complete search history.

(56) References Cited

U.S. PATENT DOCUMENTS

| | | | | |
|---|---|---|---|---|
| 6,151,136 A | * | 11/2000 | Takemoto | .................. 358/1.9 |
| 7,167,597 B2 | * | 1/2007 | Matsushima | ................ 382/274 |
| 2001/0007599 A1 | * | 7/2001 | Iguchi et al. | ................ 382/274 |
| 2002/0031256 A1 | * | 3/2002 | Hiramatsu et al. | .......... 382/162 |
| 2003/0002095 A1 | * | 1/2003 | Gruzdev et al. | ............. 358/518 |

FOREIGN PATENT DOCUMENTS

| JP | 6-90382 A | 3/1994 |
|---|---|---|
| JP | 07-327141 A | 12/1995 |
| JP | 9-135360 A | 5/1997 |
| JP | 10-248024 A | 9/1998 |
| JP | 2001-186368 A | 7/2001 |
| JP | 2001-189862 A | 7/2001 |
| JP | 2002-359748 A | 12/2002 |
| JP | 2003-8920 A | 1/2003 |
| JP | 2003-143420 A | 5/2003 |

* cited by examiner

*Primary Examiner*—Benny Q Tieu
*Assistant Examiner*—Paul F Payer
(74) *Attorney, Agent, or Firm*—Sughrue Mion, PLLC

(57) ABSTRACT

The purpose of this invention is to reproduce gradations of dark parts between devices with different ranges of reproducible brightness. The range of reproducible brightness by the printer is a range from $L_{black}$ to 100, and this is narrow in relation to the range of brightness that is able to be reproduced by the digital camera (0 to 100). An image processing apparatus converts the input brightness $L_{input}$ on the input brightness graph $L_{input}$-graph to the output brightness $L_{output}$ on the output brightness graph $L_{output}$-graph. Accordingly, the low brightness gradations 0 to $L_{black}$ of the input brightness $L_{input}$ in relation to the input RGB values included in the range R1 become $L_{black}$ to L1, the dark area gradations are reproduced.

6 Claims, 6 Drawing Sheets

IMAGE PROCESSING APPARATUS AND GRADATION REPRODUCTION METHOD

BACKGROUND OF THE INVENTION

1. Field of the Invention

This invention relates to brightness gradation reproduction between devices with different ranges of reproducible brightness.

2. Description of the Related Art

A printing systems that have a digital camera and a printer have become popular. An image data shot by the digital camera is input to the printer and the printer prints images expressed by the image data in his printing systems Image data is expressed using the device dependent color space that is dependent on each device. For example, a digital camera expresses image data using the RGB color space that is the digital camera device dependent color space, and the printer expresses image data using the CMYK color space that is the printer device dependent color space. Image data expressed by the RGB color space is converted to image data expressed by the CMYK color space that is the printer device dependent color space and output to the printer.

The brightness range that is reproducible for each color space differs for each device. By correlating the reproducible brightness by the digital camera and the reproducible brightness by the printer, the gradations of the image data shot using the digital camera are reflected in the image output by the printer.

However, the range of reproducible brightness by the printer is narrower than the range of reproducible brightness by the digital camera, and of the reproducible brightness by the digital camera, all the brightness that is lower than the black point are converted to black points. The black point is the minimum value of the reproducible brightness by the printer. Because of that, there is a problem that low brightness gradations in image data are not able to be reproduced in the images printed by the printer.

The problem described above is not a problem specialized in cases when outputting image data shot using a digital camera to a printer to print an image, but a problem that occurs in the same way between devices for which the range of reproducible brightness by the device receiving the image data is narrower than the range of reproducible brightness by the device sending the image data.

This invention was carried on in view of these problems, and the purpose is to reproduce gradations of the part for which the image data has low brightness between devices for which the range of reproducible brightness by the device that receives the image data is narrower than the range of reproducible brightness by the device that sends the image data.

SUMMARY OF THE INVENTION

In order to address at least part of the problem described above, a first aspect of this invention provides an image processing apparatus that outputs input image data that is input from an input device to an output device, wherein the input device has a input brightness area that is reproducible by the input device, wherein the output device has a output brightness area narrower than the input brightness area and is reproducible by the output device. The image processing apparatus in the first aspect of the invention comprises: a first color conversion processing module that converts the input image data to first intermediate image data, wherein the input image data is expressed using a input device dependent color space that depends on the input device, wherein the first intermediate image data at least expresses the brightness of the input image data and is expressed by an device independent color space that does not depend on each device, a brightness conversion module that converts the first intermediate image data to second intermediate image data so that gradation of first brightness is expressed in the output brightness area, wherein the first brightness is, of the first intermediate data, at least lower than the minimum value of the output brightness area, and a second color conversion processing module that converts the second intermediate data to output image data to output to the output device, wherein the output image data is expressed using an output device dependent color space that depends on the output device.

According to the image processing apparatus in the first aspect of this invention, it is possible to reproduce in the output image data the gradations of input brightness that is lower than the minimum value of the output brightness area in the input image data. Therefore, it is possible to ensure the gradation of the dark part of image data output by output device.

A second aspect of this invention provides a gradation reproduction method. The method is implemented by an image processing apparatus that outputs input image data that is input from an input device to an output device, wherein the input device has a input brightness area that is reproducible by the input device, wherein the output device has a output brightness area narrower than the input brightness area and is reproducible by the output device the gradation reproduction method comprising the steps of, The gradation reproduction method in the second aspect of the invention comprises the steps of: converting the input image data to first intermediate image data, wherein the input image data is expressed using a input device dependent color space that depends on the input device, wherein the first intermediate image data at least expresses the brightness of the input image data and is expressed by an device independent color space that does not depend on each device, converting the first intermediate image data to second intermediate image data so that gradation of first brightness is expressed in the output brightness area, wherein the first brightness is, of the first intermediate data at least lower than the minimum value of the output brightness area, and converting the second intermediate data to output image data to output to the output device, wherein the output image data is expressed using an output device dependent color space that depends on the output device.

The image processing apparatus in the second aspect of this invention may provides the same action and effect as the image processing apparatus in the first aspect of this invention. The image processing apparatus in the second aspect of this invention may also be realized in a variety of ways in the same manners as the image processing apparatus in the first aspect of this invention.

These and other objects, features, aspects, and advantages of the present invention will become more apparent from the following detailed description of the preferred embodiments with the accompanying drawings.

DESCRIPTION OF THE PREFERRED EMBODIMENT

Following, embodiment aspects of the invention are described based on the following embodiments with references to the drawings.

A. First Embodiment

Figure 1:
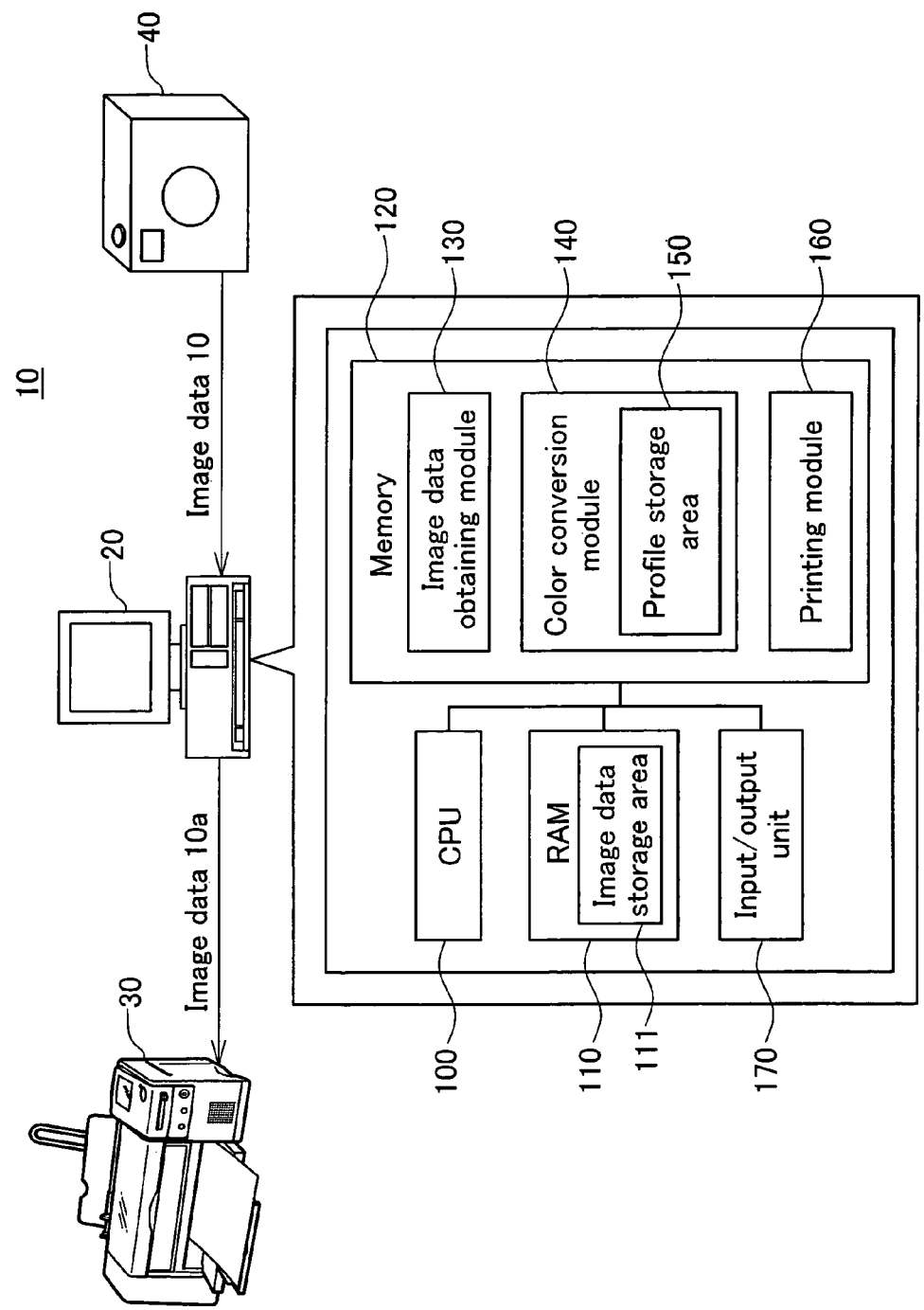
FIG. 1 exemplary illustrates an example of an image output system in the first embodiment.

A1. System Configuration:

FIG. 1 exemplary illustrates an image output system 10 in the first embodiment. The image output system 10 has an image processing apparatus 20, a printer 30, and a digital camera 40. The digital camera 40 and the image processing apparatus 20, as well as the image processing apparatus 20 and the printer 30 are respectively connected locally via a USB cable. The image processing apparatus 20 converts the image data 50 so as to be reproduced in the image on which the gradations of the brightness of image data 50 obtained from the digital camera 40 is printed with printer 30. The image processing apparatus 20 outputs the converted image data 50*a* to the printer 30.

The image processing apparatus 20 is a typical personal computer equipped with a CPU, RAM, and ROM. The functional blocks of the image processing apparatus are illustrated in the FIG. 1. Each functional block is controlled by the CPU 100. The memory 120 stores an image data obtaining module 130, a color conversion module 140, a profile storage area 150 and a printing module 160. Each functional block is implemented using software. Each functional block may be constituted using hardware. The RAM 110 is readable/writable memory. The image data recording area 111 is constituted as part of the RAM 110.

An input/output unit 170 sends and receives image data between the printer 30 and the digital camera 40.

The image data obtaining module 130 records the image data 50 obtained from the digital camera 40 onto the image data recording area 111.

An input device profile PF1 and an output device profile PF2 are stored in the profile storage area 150. The input device profile PF1 includes the color conversion information from the device dependent color space of the digital camera 40 that is the input device to the device independent color space. Also, the output device profile PF2 includes the color conversion information from the device independent color space to the device dependent color space of the printer 30 that is the output device.

The color conversion module 140 uses the input device profile PF1 and the output device profile PF2 to convert the color space of the image data 50 from the device dependent color space that depends on the digital camera 40 as the input device to the device dependent color space that depends on the printer 30 as the output device. Converting the color space means converting each pixel value of the pixels that constitute the image data 50 expressed by the device dependent color space that depends on the digital camera 40 to each of the pixel values of the image data 50*a* expressed by the device dependent color space that depends on the printer 30. The conversion process implemented by the color conversion module 140 is described later.

The printing module 160 converts the image data 50*a* converted by the color conversion module 140 to a format that is able to be interpreted by the printer 30, and outputs the converted image data 50*a* that is converted by printing module 160 to the printer 30 via the input/output unit 170.

Figure 2:
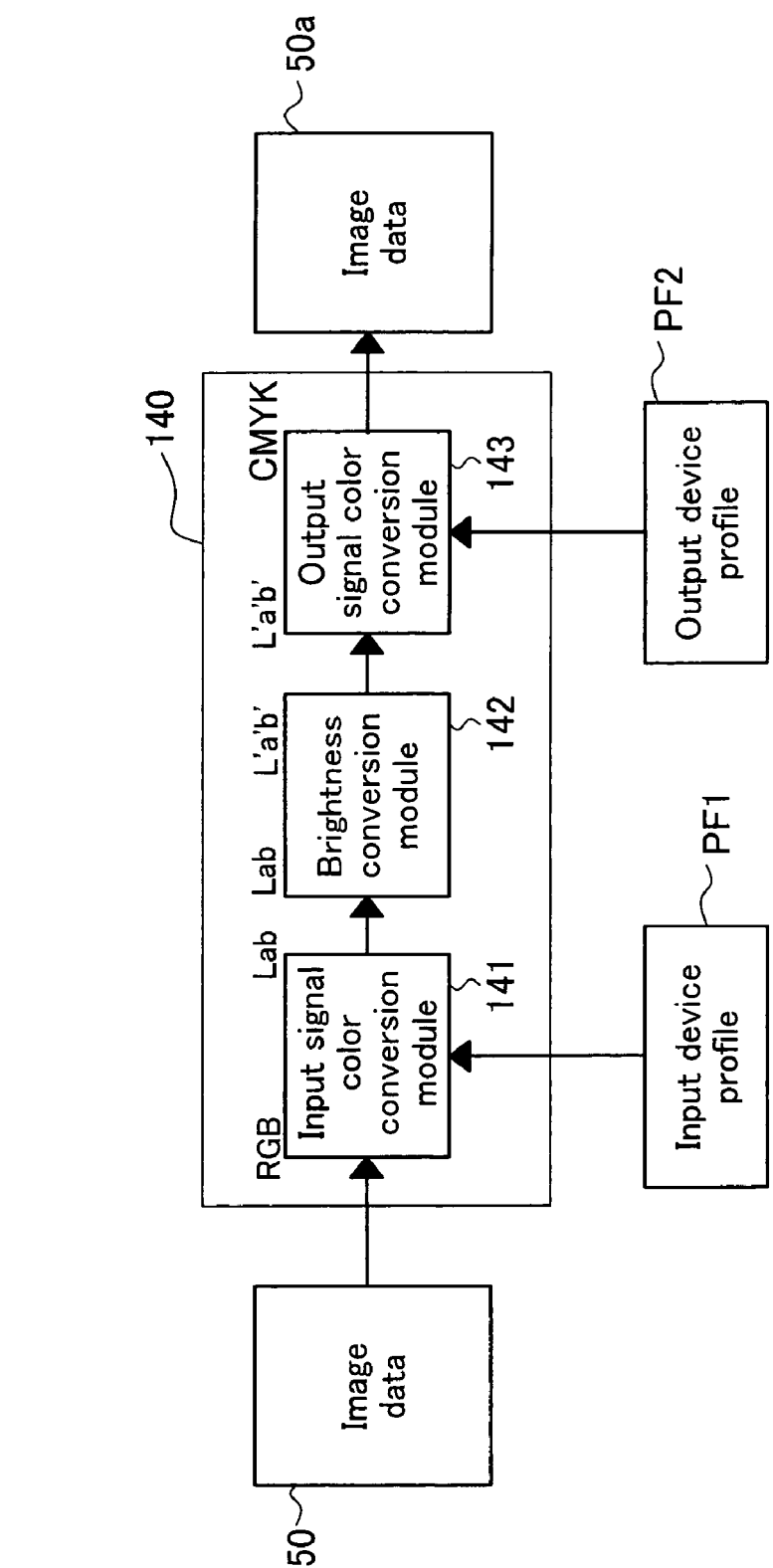
FIG. 2 exemplary illustrates a block chart describing the color conversion process in the first embodiment.

FIG. 2 exemplary illustrates a block chart that describes the color conversion process implemented by the color conversion module 140 in the first embodiment. The color conversion module 140 has an input signal color conversion module 141, a brightness conversion module 142, and an output signal color conversion module 143. The input signal color conversion module 141 correlates to the "first color conversion module" of this invention. The brightness conversion module 142 correlates to the "brightness conversion module" of this invention. The output signal color conversion module 143 correlates to the "second color conversion module" of the first embodiment. In the first embodiment, the device dependent color space of the digital camera 40 that is the input device is the RGB color space, and the pixel values of each pixel of the image data expressed by the RGB color space are expressed as (R, G, B). The device independent color space is the Lab color space and the image values of each pixel of the image data expressed by the Lab color spaces are expressed as (L, a, b). "L" represents brightness, and "a" and "b" represent chromaticity. The device dependent color space of the printer 30 that is the output device is the CMYK color space, and the pixel values of each pixel of the image data expressed by the CMYK color space are expressed as (C, M, Y, K).

The input signal color conversion module 141 implements color conversion processing from the device dependent color space of the input device, specifically, the digital camera 40, to the device independent color space. In specific terms, the input signal color conversion module 141 obtains from the input device profile PF1 the information for color conversion from the device dependent color space of the input device to the device independent color space. The input signal color conversion module 141 uses the obtained color conversion information to convert image data expressed using the RGB color space color space to image data expressed using the Lab color space. The color conversion information includes a color conversion table from the RGB color space to the Lab color space. The input signal color conversion module 141 uses the color conversion table to convert each pixel value of the image data 50 from (R, G, B) expressed using the RGB color space to (L, a, b) expressed using the Lab color space. It is also possible to include in the color conversion information an RGB-Lab color conversion matrix, for example.

Figure 3:
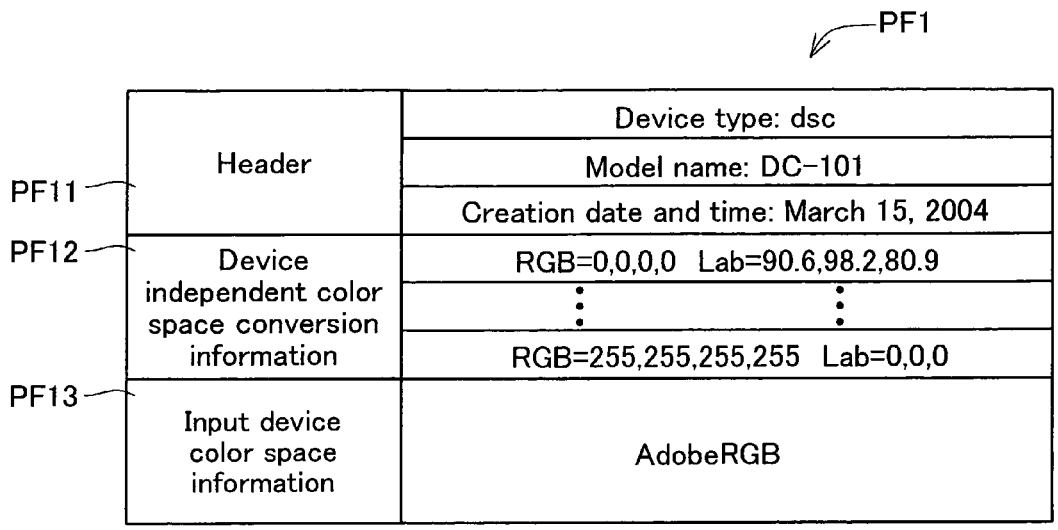
FIG. 3 exemplary illustrates an example of the contents of the input device profile in the first embodiment.

The contents of the input device profile PF1 are described with reference to the FIG. 3. FIG. 3 exemplary illustrates of the contents of the input device profile PF1 in the first embodiment. The input device profile PF1 includes a header part PF11, device independent color space conversion information PF12, and input device color space information PF13. The header part PF11 includes the device type indicating the type of input device, the model name, and the creation date and time of the input device profile PF1. The device independent color space conversion information PF12 includes an RGB-Lab color conversion table as the color conversion information necessary for converting the image data 50 expressed using the device dependent color space (RGB color space) of the digital camera 40 that is the input device to the image data 50 expressed using the device independent color space (Lab color space).

The color space information PF13 includes information relating to the color space that the digital camera, which is the input device, is able to reproduce. The input device profile PF1 is stored in the memory 120 together with installation of the input device driver. The input device profile PF1 is able to be supplied correlated to the image data 50, for example.

The brightness conversion module 142, in the Lab color space that is the device independent color space, converts the input brightness L of the image data 50 and calculates the output brightness L' so that the gradation of the reproducible brightness by the input device is reproduced within the range of reproducible brightness by the output device.

Though an illustration is omitted in FIG. 3, the color conversion module 140 includes a color area mapping module to correlate of the input color area expressing the reproducible range of chromaticity by the input device and the output color area that expresses the range of reproducible chromaticity by the output device. The color area mapping module converts the chromaticity (a, b) of the image data 50 to the chromaticity (a', b'), wherein the chromaticity (a, b) is expressed by the reproducible color area by the digital camera that is the input device, and the chromaticity (a', b') is expressed by the reproducible color area by the printer that is the output device.

The pixel values of the image data 50 are converted (L, a, b) to (L', a', b') by the brightness conversion module 142 and the color area mapping module.

The output signal color conversion module 143 implements color conversion processing from the device independent space to the device dependent color space of the digital camera 40 that is the output device. In specific terms, the output signal color conversion module 143 obtains the color conversion information from the output device profile PF2. The output device profile PF2 includes information to convert from the device independent color space of the output device to the device dependent color space. The output signal color conversion module 143 uses the obtained color conversion information to convert image data expressed using the Lab color space color space to image data expressed using the CMYK color space. The color conversion information includes a color conversion table from the Lab color space to the CMYK color space. The output signal color conversion module 143 uses the color conversion table to convert each pixel value of the image data 50 from (L', a', b') expressed by the Lab color space to (C, M, Y, K) expressed by the CMYK color space. It is also possible to include in the color conversion information a Lab-CMYK color conversion matrix, for example.

Figure 4:
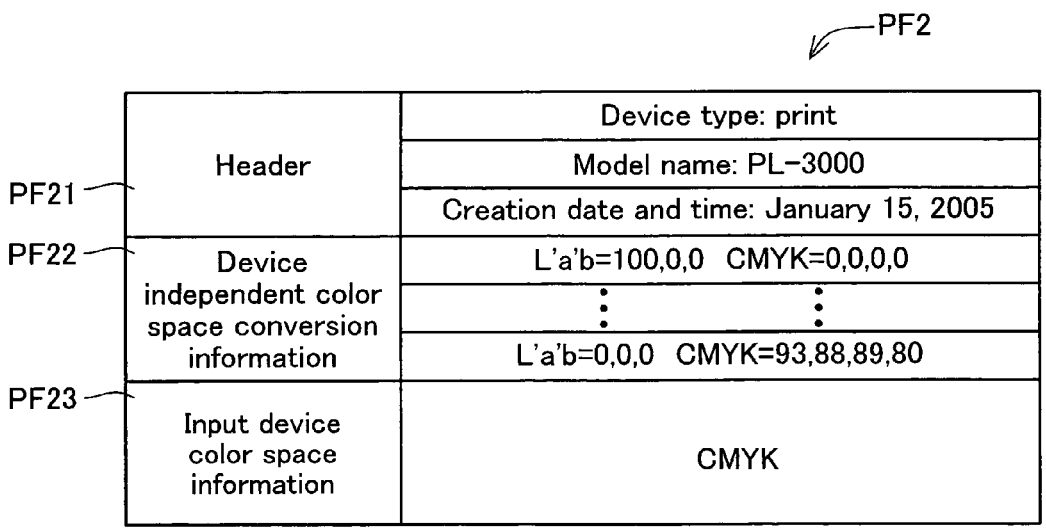
FIG. 4 exemplary illustrates an example of the contents of the output device profile of the first embodiment.

The contents of the output device profile PF2 are described using FIG. 4. FIG. 4 exemplary illustrates an example of the contents of the output device profile PF2 in the first embodiment. The output device profile PF2 has the same constitution as the input device profile PF1, and consists of a header part PF21, device independent color space conversion information PF22, and input device color space information PF23. The header part PF21 includes the device type that indicates the input device type, the model name, and the creation date and time of the output device profile PF2. The device independent color space information PF22 includes the Lab-CMYK color conversion table as color conversion information necessary to confer the image data 50 expressed by the device independent color space (Lab color space) to image data 50a expressed by the device dependent color space (CMYK color space) of the printer 30 that is the output device. The color space information PF23 includes information relating to the reproducible color space by the printer which is the output device.

Figure 5:
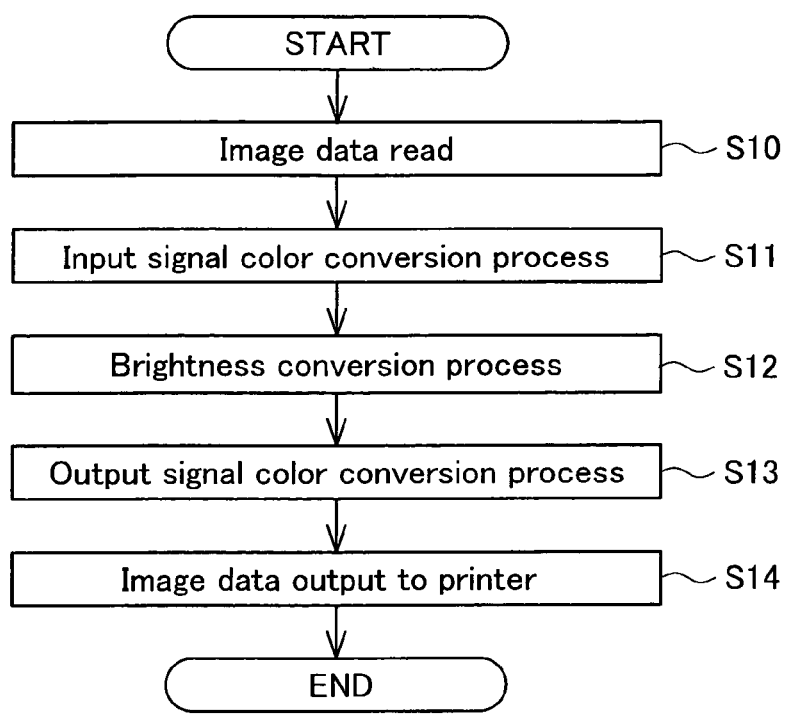
FIG. 5 exemplary illustrates a flow chart describing the printing process in the first embodiment.

A2. Printing Process:

FIG. 5 exemplary illustrates a flow chart for describing the printing process in the first embodiment. The image processing apparatus 20 starts this printing process with printing instructions from the user as the trigger. When the image processing apparatus 20 receives the printing instructions from the user, the image processing apparatus 20 reads the image data recorded in the image data recording area 111 (step S10), implements input signal color conversion processing, and converts each pixel value (R, G, B) of the image data 50 expressed by the RGB color space to (L, a, b) expressed by the Lab color space (step S11).

The image processing apparatus 20 implements color area and brightness conversion on each pixel value (L, a, b) of the image data 50 expressed by the Lab color space, and converts each pixel value to (L', a', b') (step S12). In the first embodiment, only the selected input brightness $L_{input}$ that is the brightness of the achromatic pixels of the pixels of the image data 50 are converted to the output brightness $L_{output}$ using the equation 3 shown below.

[Equation 3] (Equation 3)

$$L_{output} = (L_{max} - L_{black})\left(\frac{L_{output}}{L_{max}}\right)^{\gamma} + L_{black}$$

$$\gamma = \frac{L_{max}}{L_{max} - L_{black}},$$

Figure 6:
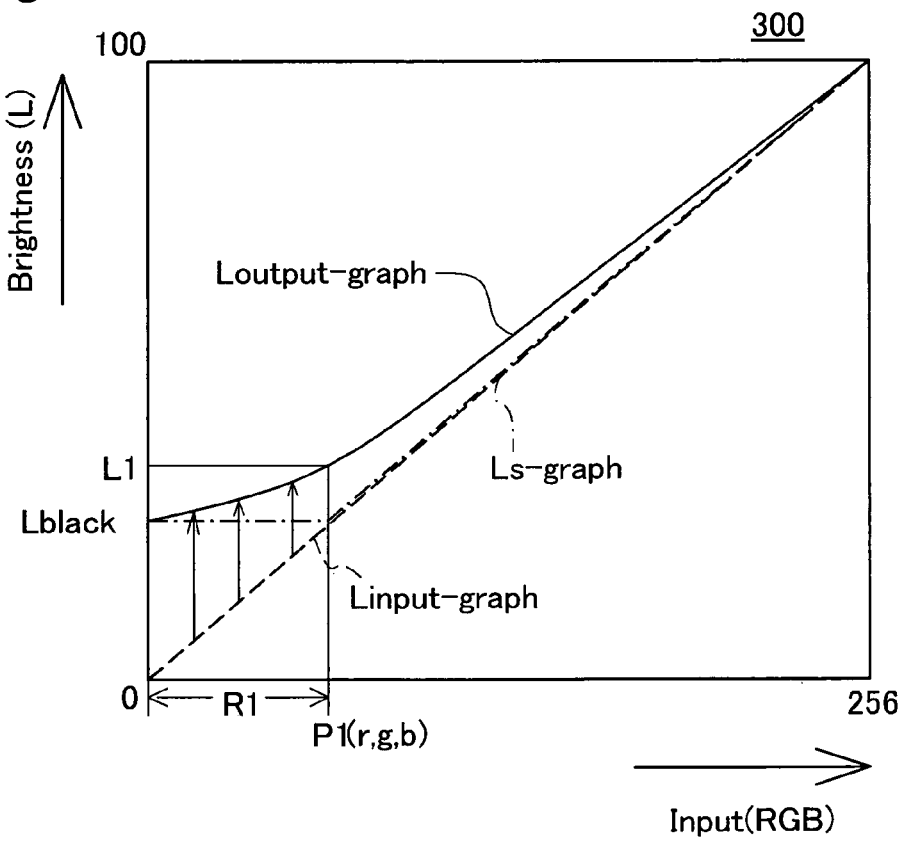
FIG. 6 exemplary illustrates a brightness graph representing the brightness gradation in the first embodiment.

$L_{max}$: Maximum value of brightness for the Lab color space
$L_{black}$: Minimum value of the reproducible brightness by the printer
$L_{input}$: selected input brightness
$L_{output}$: Output brightness Gradation change by the input brightness conversion process is described in reference to FIG. 6. FIG. 6 exemplary illustrates a brightness graph 300 that expresses brightness gradation changes in the first embodiment. The horizontal axis of the brightness graph 300 represents the RGB value of the input image data 50, and the vertical axis represents the output brightness L of the image data. For the input RGB values, each value (R, G, B) changes in sequence from (0, 0, 0) to (1, 1, 1) (2, 2, 2) . . . (255, 255, 255). The output brightness $L_{output}$ has a range from 0 to 100. $L_{black}$ that represents the minimum value of the reproducible brightness by the printer 30 which is the output device shows black points that are the darkest spots of the brightness.

The input brightness graph $L_{input}$ shows the reproducible brightness by the digital camera 40 for the input RGB values. As shown in FIG. 6, as the input RGB value increases, the output brightness L gradually becomes higher, in other words, as the input RGB value increases, the brightness is higher. The output brightness graph Ls shows the reproducible output brightness Lout by the printer 30 when using the conventional method. The output brightness graph $L_{output}$ is a graph representing the output brightness $L_{output}$ calculated applying equation 3 in the first embodiment to the input RGB values.

The range of reproducible brightness by the printer 30 is a range from $L_{black}$ to 100, and is narrower than the range of reproducible brightness by the digital camera 40 (0 to 100). Because of that, with the conventional brightness conversion processing, as shown in the output brightness graph Ls, when the RGB values of each pixel value of the input image data is included in the range R1 from (0, 0, 0) to the P1 (r, g, b), all of the input brightness $L_{input}$ are converted to $L_{black}$, and the gradations of the input brightness $L_{input}$ are not reproduced with the output brightness $L_{out}$.

In the first embodiment, by the brightness conversion module 142 implementing the brightness conversion process applying equation 3, the output brightness graph $L_{output}$-graph is obtained as a graph representing brightness that is able to be reproduced by the printer 30. By applying the equation 3, as shown by the arrow, the brightness conversion module 142 converts the input brightness $L_{input}$ on the input brightness graph $L_{input}$-graph to the output brightness $L_{output}$ on the output brightness graph $L_{output}$-graph. Specifically, the brightness conversion module 142 reproduces as $L_{black}$ to L1 the low brightness gradations from 0 to $L_{black}$ of the input brightness $L_{input}$ for the input RGB values included in the range R1.

According to the image processing apparatus of the first embodiment described above, by applying equation 3, even when the range of reproducible brightness by the printer that is the output device is narrower than the range of reproducible brightness by the digital camera that is the input device, it is possible to reproduce the gradations of the brightness of the image data shot using the digital camera in the image printed using the printer. Conventionally, of the image data brightness, brightness lower than the black points of the printer were all converted to printer black points, and with images output by the printer, low brightness gradations were not expressed, but with this invention, it is possible to express gradation of low brightness of image data shot using the digital camera for images output by the printer.

Also, equation 3 is applied not only to low brightness input brightness but to all the input brightness, so for reproducible brightness by the printer, it is possible to ensure gradation properties for the low brightness part and also to reproduce gradations smoothly for all the brightness.

B. Second Embodiment

With the first embodiment described above, by applying equation 3 to the achromatic input brightness, the gradation properties of the reproducible brightness by the printer are ensured. In the second embodiment, considering chroma saturation, the gradations of the brightness in a digital camera are reproduced in the range for which brightness is able to be reproduced by the printer. The system configuration in the second embodiment is the same as the system configuration in the first embodiment.

Figure 7:
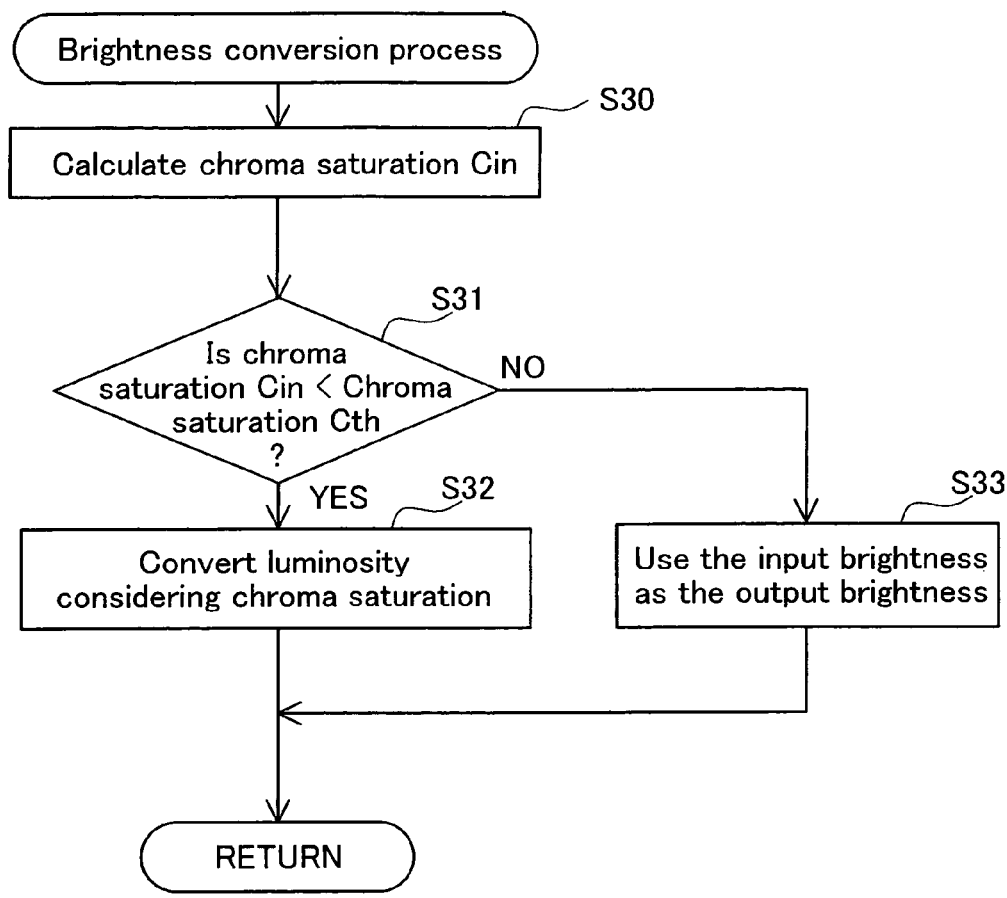
FIG. 7 exemplary illustrates a flow chart describing the brightness conversion process in the second embodiment.

B1. Brightness Conversion Process:

FIG. 7 exemplary illustrates a flow chart for describing the brightness conversion process in the second embodiment. This brightness conversion process is implemented by the brightness conversion module 142, and correlates to the process of step S12 in FIG. 5.

The brightness conversion module 142 calculates the input chroma saturation $C_{input}$ of each pixel value of the image data expressed using the Lab color space (step 30). The brightness conversion module 142 calculates the input chroma saturation $C_{input}$ by applying the equation 4 below.

[Equation 4]

$$C_{input} = \sqrt{a_{input}^2 + b_{input}^2} \quad \text{(Equation 4)}$$

(Where $a_{input}$ and $b_{input}$ are the "a" and "b" values of the input pixels for the Lab color space)

The brightness conversion module 142 determines whether the input chroma saturation $C_{input}$ is lower than the chroma saturation threshold value $C_{th}$ (step S31). The chroma saturation threshold value $C_{th}$ represents ⅔ of the lowest chroma saturation value for the outside edge of the chromaticity of the Lab color space. When the input chroma saturation $C_{input}$ is lower than the chroma saturation threshold value $C_{th}$ (step S31: Yes), the brightness conversion module 142 converts input brightness Linput to the output brightness $L_{output}$ by in consideration of the chroma saturation brightness (step S32). In specific terms, the brightness conversion module 142 calculates the output brightness $L_{final}$ by applying the equation 5 below. Specifically, with a range for which the input chroma saturation $C_{input}$ is from 0 to the chroma saturation threshold value $C_{th}$, the output brightness $L_{final}$ is calculated by varying the mixture ratio of the input brightness $L_{input}$ and the output brightness $L_{output}$. Note that $L_{output}$ is the value calculated by applying equation 3 in the first embodiment, and correlates to the "tentative output brightness" for this invention.

[Equation 5]

$$L_{final} = \left(L_{input} * \left(\frac{C_{input}}{C_{max}}\right)\right) + \left(L_{output} * \left(\frac{C_{max} - C_{input}}{C_{max}}\right)\right) \quad \text{(Equation 5)}$$

$C_{th}$: Chroma saturation threshold value for the Lab color space $L_{final}$: Output brightness after conversion When the input chroma saturation $C_{input}$ is the chroma saturation threshold value $C_{th}$ or greater (step S31: No), the brightness conversion module 142 uses the input brightness $L_{input}$ as is as the output brightness $L_{final}$ applying equation 6 (step S33). Specifically, with the range for which the input chroma saturation $C_{input}$ is from the chroma saturation threshold value $C_{th}$ to the chroma saturation maximum value, the input brightness $L_{input}$ is used as the output brightness $L_{final}$.

[Equation 6]

$$L_{final} = L_{input} \quad \text{(Equation 6)}$$

Figure 8:
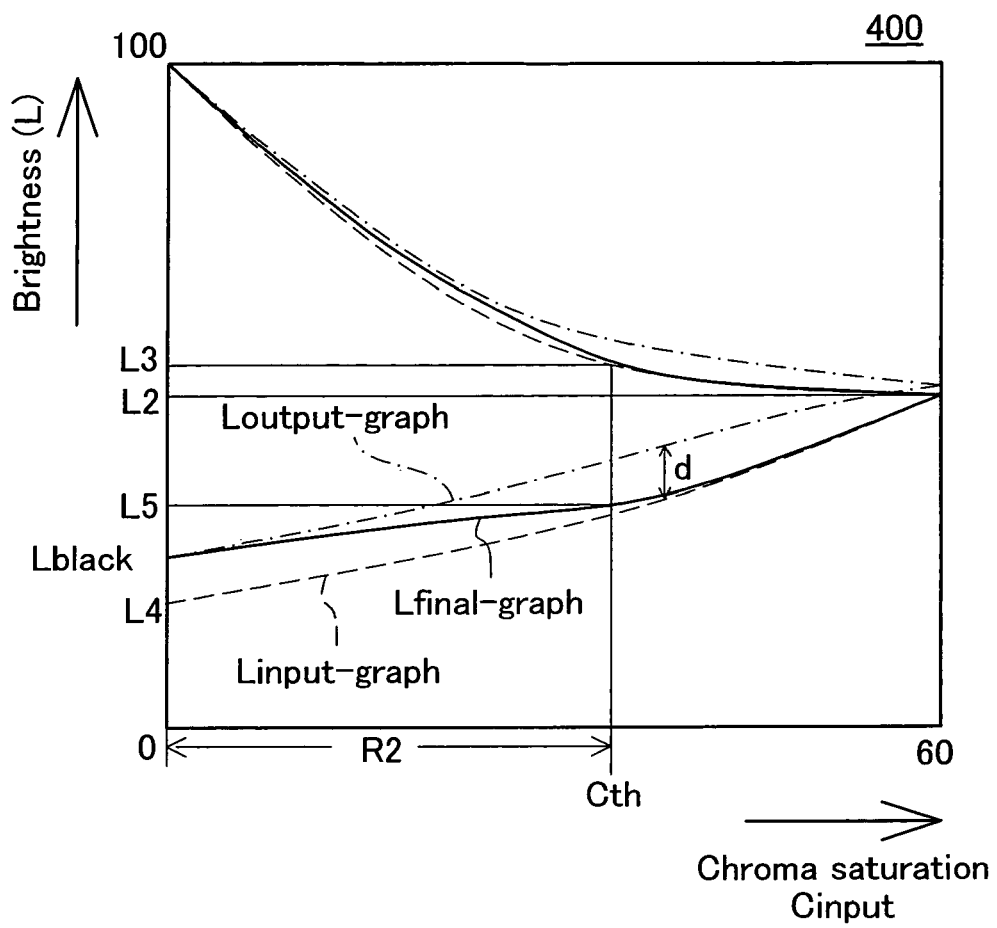
FIG. 8 exemplary illustrates a brightness graph representing the brightness gradation in the second embodiment.

Gradation reproduction considering chroma saturation is described with reference to FIG. 8. FIG. 8 exemplary illustrates a brightness graph 400 representing brightness gradation changes in the second embodiment. The horizontal axis of the brightness graph 400 represents the input chroma saturation $C_{input}$ of the image data 50, and the vertical axis represents the brightness L of the image data. The input chroma saturation Cinput uses a value in the range from 0 to 60. The brightness L uses a value in the range from 0 to 100. $L_{black}$ representing the minimum value of the reproducible brightness by the printer 30 that is the output device shows the darkest point of the brightness, in other words, black points. In the second embodiment, described is an example of a color for which the brightness is L4 when the input chroma saturation $C_{input}$ is 0.

The input brightness graph $L_{input}$-graph shows the reproducible input brightness $L_{input}$ by the digital camera 40 for the input chroma saturation $C_{input}$. As shown in FIG. 8, with the digital camera 40, as the input chroma saturation $C_{input}$ increases from 0 to 60, the brightness L also gradually increases from L4 to L2 and as the input chroma saturation Cinput gradually decreases from 60 to 0, the brightness L increases from L2 to 100.

The output brightness graph $L_{output}$-graph shows the reproducible output brightness $L_{output}$ by the printer 30 on the chroma saturation $C_{input}$. The output brightness $L_{output}$ is calculated applying equation 3 in the first embodiment. The output brightness graph $L_{final}$-graph shows the reproducible output brightness $L_{final}$ by the printer 30 on the input chroma saturation $C_{input}$. The output brightness $L_{final}$ is calculated applying equation 5 in the second embodiment.

When brightness conversion processing is implemented applying only equation 3 in the first embodiment, as shown in the output brightness graph $L_{output}$-graph, as the chroma saturation increases, the output brightness $L_{output}$ has a higher value than the input brightness Linput, with the result that and the brightness is not reproduced appropriately.

In the second embodiment, by the brightness conversion module 142 implementing brightness conversion processing applying equation 5, the output brightness graph $L_{final}$-graph is obtained showing the output brightness Lfinal. As shown in the brightness graph 400, as the input chroma saturation $C_{input}$ increases from 0 to the chroma saturation threshold value Cth, the output brightness $L_{final}$ increases from $L_{black}$ to L5 so that the gradations of the input brightness $L_{input}$ are reproduced. As the input chroma saturation Cinput increases from the chroma saturation threshold value Cth to 60, the output brightness $L_{final}$ uses the same value as the input brightness $L_{input}$, and increases from L5 to L2. Even the part for which the input chroma saturation Cinput becomes lower from 60 to the chroma saturation threshold Cth, the output brightness $L_{final}$ uses the same value as the input brightness $L_{input}$ and increases from L2 to L3. As the input chroma saturation $C_{input}$ decreases from the chroma saturation threshold value Cth to 0, the output brightness $L_{final}$ increases from L3 to 100.

In the second embodiment, when the input chroma saturation $C_{input}$ is less than the chroma saturation threshold value Cth, the mixture ratio of the input brightness $L_{input}$ and the output brightness $L_{output}$ is varied to calculate the output brightness $L_{final}$ and the condition branching midway in the calculation is simplified, but when the input chroma saturation $C_{input}$ changes decreasingly from a maximum value of 60 to 0, the same as when the input chroma saturation $C_{input}$ is the chroma saturation threshold value Cth or greater, it is also possible to use the input brightness $L_{input}$ as the output brightness Lfinal. This is because in the range for which the brightness is high, it is possible for the printer 30 to reproduce the input brightness $L_{input}$ without converting the input brightness $L_{input}$.

According to the image processing apparatus in the second embodiment described above, in the low chroma saturation area, in other words, the low chroma saturation area near the achromatic axis, the ratio of the output brightness $L_{output}$ is made higher than the input brightness $L_{input}$ to mix the input brightness $L_{input}$ and the output brightness $L_{output}$, as the input chroma saturation $C_{input}$ comes closer to the chroma saturation threshold value Cth, by making the ratio of the input brightness $L_{input}$ higher than the output brightness $L_{output}$ and mixing the input brightness $L_{input}$ and the output brightness $L_{output}$, it is possible to reproduce the gradations of the image data brightness with good precision. Also, in the high chroma saturation area, it is possible to use the input brightness as is as the output brightness, and it is possible to improve the precision of gradation reproduction.

C. Variation Embodiments (1) In the first embodiment described above, the Lab color space was used as the device independent color space, but it is also possible to use the LUV color space or the YCrCb color space. It is acceptable as long as it is a device independent color space that uses brightness as one of the components.

(2) In the second embodiment described above, the chroma saturation threshold value Cth was set as ⅔ the chroma saturation value of the lowest chroma saturation value for the outside edge of the chroma saturation of the Lab color space, but it is also possible to use ½ the chroma saturation value of the lowest chroma saturation value, for example. The chroma saturation maximum value and the color area characteristics differ for each device, so it is preferable to set the chroma saturation maximum value and the chroma saturation threshold value Cth according to the device.

Above, various embodiments of the invention were described, but the invention is not limited to these embodiments, and it is clearly possible to have various constitutions in a range that does not stray from its key points.

The Japanese patent applications as the basis of the priority claim of this application are incorporated in the disclosure here of by reference:

(1) Japanese Patent Application No. 2005-90765(filing data: Mar. 28, 2005).

What is claimed is:

1. An image processing apparatus that outputs input image data to an output device, wherein the input image data is input from an input device, wherein the input device has an input brightness area that is reproducible by the input device, wherein the output device has an output brightness area narrower than the input brightness area and is reproducible by the output device, the image processing apparatus comprising:

a first color conversion processing module that converts the input image data to first intermediate image data, wherein the input image data is expressed using an input device dependent color space that depends on the input device, wherein the first intermediate image data at least expresses the brightness of the input image data and is expressed by a device independent color space that does not depend on each device, a brightness conversion module that converts the first intermediate image data to second intermediate image data so that gradation of a first brightness is expressed in the output brightness area, wherein the first brightness is, of the first intermediate data, at least lower than the minimum value of the output brightness area, and a second color conversion processing module that converts the second intermediate data to output image data to output to the output device, wherein the output image data is expressed using an output device dependent color space that depends on the output device, wherein the brightness conversion module converts the first brightness to a second brightness of the second intermediate data by applying equation 1 to the first brightness $$L_{output} = (L_{max} - L_{black})\left(\frac{L_{input}}{L_{max}}\right)^T + L_{black} \quad \text{(Equation 1)}$$

$$\gamma = \frac{L_{max}}{L_{max} - L_{black}},$$

$L_{max}$: Maximum value of the brightness in the device independent color space $L_{black}$: Minimum value of the brightness that the output device is reproducible $L_{input}$: First brightness of the first intermediate data $L_{output}$: Second brightness.

2. The image processing apparatus according to claim 1, wherein the brightness conversion module comprises:

a tentative output brightness obtaining module that obtains tentative brightness by applying the equation 1 to the first brightness, a chroma saturation obtaining module that obtains input chroma saturation that represents the vividness of the first intermediate data, and a chroma saturation determination module that determines whether the input chroma saturation is chroma saturation threshold value or below in the independent color space, wherein the chroma saturation threshold value represents a specified chroma saturation, and a conversion module that converts the first brightness to second brightness using the first brightness and the tentative brightness in consideration of the chroma saturation and the chroma saturation threshold value when it is determined that the chroma saturation is lower than the chroma saturation threshold value.

3. The image processing apparatus according to claim 2, wherein the conversion module converts the first brightness to the second brightness applying equation 2

$$L_{final} = \left(L_{input} * \left(\frac{C_{input}}{C_{mov}}\right)\right) + \left(L_{output} * \left(\frac{C_{max} - C_{input}}{C_{max}}\right)\right) \quad \text{(Equation 2)}$$

$C_{input}$: Chroma saturation of the first intermediate image data
$C_{max}$: Chroma saturation threshold value
$L_{final}$: Second brightness.

4. The image processing apparatus according to claim 2, wherein the conversion module uses the first brightness as the second brightness when it is determined that the chroma saturation is the chroma saturation threshold value or higher.

5. The image processing apparatus according to claim 3, wherein the conversion module uses the first brightness as the second brightness when it is determined that the chroma saturation is the chroma saturation threshold value or higher.

6. A gradation reproduction method by an image processing apparatus, wherein the image processing apparatus that outputs input image data that is input from an input device to an output device, wherein the input device has an input brightness area that is reproducible by the input device, wherein the output device has an output brightness area narrower than the input brightness area and is reproducible by the output device the gradation reproduction method comprising the steps of, converting the input image data to first intermediate image data, wherein the input image data is expressed using an input device dependent color space that depends on the input device, wherein the first intermediate image data at least expresses the brightness of the input image data and is expressed by a device independent color space that does not depend on each device, converting the first intermediate image data to second intermediate image data so that gradation of a first brightness is expressed in the output brightness area, wherein the first brightness is, of the first intermediate data at least lower than the minimum value of the output brightness area, and converting the second intermediate data to output image data to output to the output device, wherein the output image data is expressed using an output device dependent color space that depends on the output device wherein the first brightness is converted to a second brightness of the second intermediate data by applying equation 1 to the first brightness $$L_{output} = (L_{max} - L_{black})\left(\frac{L_{input}}{L_{max}}\right)^{\gamma} + L_{black} \quad \text{(Equation 1)}$$

$$\gamma = \frac{L_{max}}{L_{max} - L_{black}},$$

$L_{max}$: Maximum value of the brightness in the device independent color space
$L_{black}$: Minimum value of the brightness that the output device is reproducible
$L_{input}$: First brightness of the first intermediate data
$L_{output}$: Second brightness.

* * * * *